United States Patent Office 2,916,473
Patented Dec. 8, 1959

2,916,473
METHYLOL-PHOSPHORUS MODIFIED EPOXY RESINS

Austin L. Bullock, Wilson A. Reeves, and John D. Guthrie, New Orleans, La., assignors to the United States of America as represented by the Secretary of Agriculture No Drawing. Application June 17, 1955
Serial No. 516,346

3 Claims. (Cl. 260—47)

(Granted under Title 35, U.S. Code (1952), sec. 266)

A non-exclusive, irrevocable, royalty-free license in the invention herein described, throughout the world, for all purposes of the United States Government, with the power to grant sublicenses for such purposes, is hereby granted to the Government of the United States of America.

This invention relates to chemically modified epoxy resins. More particularly, the invention provides epoxy resins in which phosphine oxide or phosphonium salt groups are combined into the molecules of the glycidyl polyethers by means of ether linkages.

The epoxy resins are the glycidyl polyethers produced by reacting epoxy compounds with polyhydric compounds. They have a structure typified by the reaction products of epichlorohydrin and p,p'-dihydroxydiphenyl dimethyl methane, which have the structure:

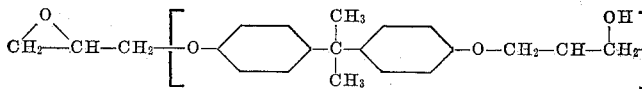

The molecules of an unmodified epoxy resin contain two terminal vic-epoxy groups,

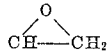

and, in general, the molecules of a modified epoxy resin contain one such epoxy group.

We have now discovered that epoxy polymers containing terminal vic-epoxy groups react with mono or polymeric phosphorus compounds of the class defined below, so that the terminal vic-epoxy groups of the epoxy polymers combine with methylol phosphorus (PCH$_2$OH) groups of the phosphorus compounds in accordance with the equation:

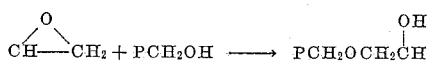

We have also found that the methylol-phosphorus modified epoxy resins exhibit an enhanced resistance to burning, and, when certain phosphorus compounds are employed, they also exhibit an enhanced fluidity and water solubility. The methylol-phosphorus modified epoxy resins are generally useful wherever an epoxy resin is useful. They are particularly useful wherever resistance to burning is a desirable property.

In general, in accordance with the present invention, vic-epoxy resins that contain terminal epoxy groups are modified by reacting them with a phosphorus compound of the formula

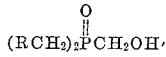

and [(RCH$_2$)$_3$PCH$_2$OH]+A$^-$ where A represents a monovalent anion and R represents OH or a radical produced by the reaction of the OH of a PCH$_2$OH group with a compound capable of reacting with a PCH$_2$OH group, so that at least one PCH$_2$OH group of the phosphorus compound combines with at least one

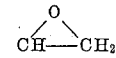

group of the epoxy resin. The methylol phosphorus modified epoxy resins are epoxy resins in which terminal vic-epoxy groups have been altered by a cleavage of the epoxy ring which leaves one of the vic-carbon atoms that was attached to the epoxy oxygen atom attached to an OH group and the other vic-carbon atom that was attached to the epoxy oxygen atom attached to an ether group having a formula which is a member of the group consisting of

and

where A represents a monovalent anion, R represents a radical of the group consisting of OH and a radical produced by reacting the OH of a PCH$_2$OH group with a compound capable of reacting with a PCH$_2$OH group and R$_1$ represents a residue of an epoxy resin.

The reaction is very general in nature. The reactants can each be one or more members of a broad class of compounds. No catalysts or solvents are required, but a wide variety of catalysts and/or solvents can be employed if desired.

Suitable phosphorus compounds include tris(hydroxymethyl) phosphine oxide, a phosphonium salt of the formula [(HOCH$_2$)$_4$P]+A$^-$ in which A represents a monovalent anion, and the products of reacting either the phosphine oxide or the phosphonium salt with a "methylol reacting" compound (i.e. a compound capable of reacting with a PCH$_2$OH group) to produce a derivative that retains at least one PCH$_2$OH group. The phosphonium chloride, THPC, of the formula (HOCH$_2$)$_4$PCl, is a readily obtainable phosphonium salt, and is the preferred salt for employment in the present process. However, by the usual procedures for replacing the anion of such an onium salt, the phosphonium choloride can readily be converted to, and employed in the form of, for example: the phosphonium hydroxide (HOCH$_2$)$_4$POH; the phosphonium acetate (HOCH$_2$)$_4$POAc; the phosphonium dihydrogen phosphate

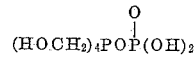

or the like phosphonium salt. The methylol phosphorus group containing derivatives of the phosphine oxide or the phosphonium salt can be a substantially monomeric product of reacting the phosphorus compound with at least one methylol reacting compound which is monofunctional in its capacity to react with PCH$_2$OH groups, so that from about 1 to 2 moles of the methylol reacting compound combines with each mole of the phosphorus compound. Illustrative examples include the products of so reacting the phosphine oxide and/or the phosphonium salt with at least one: secondary amines such as diethylamine, N-vinyl cyclohexylamine, or the like; N-substituted amides such as N-methyl acrylamide, N-N'-trimethyl pinic acid diamide, N-propyl benzamide and the like; acids such as stearic acid, pinonic acid, monobutyl phthalate, and the like; and the like monofunctional reactants. The methylol phosphorus containing derivative of the phosphine oxide or the phosphonium salt can be a polymeric product produced by reacting the phosphorus compound with a compound which is polyfunctional in its capacity to react with methylol phosphorus groups and terminating the reaction before all of the methylol phosphorus groups have reacted; i.e., the methylol phosphorus containing derivative can be a further polymerizable "methylol phosphorus" polymer.

Prior work has resulted in the development of a variety of polymers capable of being produced by condensation and/or esterification reactions involving tetrakis(hydroxymethyl) phosphonium chloride, which has the formula $(HOCH_2)_4PCl$, and is abbreviated THPC, and/or tris(hydroxymethyl) phosphine oxide, which has the formula $(HOCH_2)_3PO$, and is abbreviated THPO. The methylol-phosphorus, i.e., $PCH_2OH$ groups, of each of these compounds are capable of either: (1) condensing with a compound which is capable of condensing with formaldehyde; or, (2) being esterified by an esterifying agent which is capable of esterifying methanol.

The polymers capable of being produced by condensation and/or esterification reactions of the phosphorus compounds can be produced in the form of cross-linked polymers or thermosetting resins; and, hereinafter, these polymers are referred to by the term "methylol-phosphorus" polymers or resins. The compounds capable of either condensing with formaldehyde or esterifying methanol are hereinafter referred to by the term "methylol-reacting compounds."

The methylol-phosphorus polymers are characterized by recurring structural units containing phosphorus atoms in radicals of the group $(-CH_2)_4PCl$ and $(-CH_2)_3PO$. Methylol-phosphorus alkyds are produced by reacting at least one of the phosphorus compounds with at least one polycarboxylic acid esterifying agent. Such polymers are more fully described in copending application Serial No. 393,022 filed November 18, 1953, now Patent No. 2,768,997. Phenolic methylol-phosphorus polymers are produced by reacting at least one of the phosphorus compounds with at least one phenolic compound. Such polymers are more fully described in copending application Serial No. 421,212 filed April 5, 1954, now Patent No. 2,846,413. Nitrilo methylol-phosphorus polymers are capable of being produced by condensing at least one of the phosphorus compounds, with the elimination of water, with at least one organic nitrogen compound having a molecular weight of not more than about 800 and containing at least one trivalent nitrogen atom and at least two members of the group H and $CH_2OH$ attached to trivalent nitrogen atoms. This class of organic nitrogen compounds is hereinafter referred to by the term "nitrogen compounds." Methods of producing the nitrilo methylol-phosphorus polymers and employing them to reduce the flammability of textiles are more completely described in copending patent applications, Serial No. 378,437 filed September 3, 1953, now Patent No. 2,809,941; Serial No. 393,021, filed November 18, 1953, now Patent No. 2,772,188; Serial No. 393,023 filed November 18, 1953, now Patent No. 2,795,569; and Serial No. 467,899, filed November 9, 1954, now Patent No. 2,814,573. Patent No. 2,795,569 shows the reaction between the phosphorus compounds and phenols or trivalent nitrogen compounds, such as, primary amines, secondary amines, amides, polypeptides, water-soluble methylol derivatives of said nitrogen compounds. Other reaction products of THPC or THPO with methylolmelamine, triethanolamine, and urea are also disclosed in Serial No. 467,902, filed November 9, 1954, now Patent No. 2,810,701.

Illustrative examples of methylol phosphorus polymers which can be used as the phosphorus compound employed in the present process include the further polymerizable nitrilo methylol-phosphorus polymer, such as, the polymer of THPC and methylolmelamine; the methylol-phosphorus alkyds such as the polymer of THPC and chlorendic acid; and the methylol-phosphorus phenolic polymers such as the polymer of THPC and resorcinol, described in the above referred to copending applications. Mixtures of THPC and THPO predominating in THPC are preferred phosphorus compounds for employment in the present process.

Substantially any epoxy resin that contains terminal vic-epoxy groups can be modified in accordance with the present invention. The epoxy resin can be one prepared by substantially any of the known processes for producing vic-epoxy resins, as for example, by reacting epichlorhydrin or epibromhydrin with polyhydric alcohols, phenols and the like. Polyhydric phenol epoxy resins and the fatty acid modified epoxy resins such as those disclosed in U.S. Patent No. 2,456,408 are preferred. An epoxy resin containing about one terminal vic-epoxy group per each 125 to 425 units of gram molecular weight, such as the resins available under the trade names Epon, Araldite, Bakelite, and Epiphen are particularly preferred.

The proportions of the phosphorus compounds and the epoxy resin can be varied widely; from a mixture containing almost trace amounts of one reactant to a mixture containing almost trace amounts of the other. Where a catalyst is desired, either an acidic or basic catalyst can be employed. Suitable acidic catalysts include organic or inorganic acids such as hydrochloric, phosphoric, acetic, butyric and the like acids. Suitable basic catalysts include the alkali metal carbonates or bicarbonates, ammonia, organic amines such as trimethylamine, quaternary ammonium hydroxides such as quaternary metal ammonium hydroxide and the like. The reaction can be conducted in the absence of a solvent or in the presence of a liquid which is appreciably miscible with both reactants.

The modified vic-epoxy resins produced in accordance with the present invention can be cured or hardened with substantially any of the acidic or amino curing or hardening agents for epoxy resins. In general, where the vic-epoxy resin is modified by means of a phosphorus compound containing a plurality of $PCH_2OH$ groups under conditions producing a modified vic-epoxy resin containing $PCH_2OH$ groups, the epoxy resin curing or bonding agents cross link the free $PCH_2H$ groups under substantially the same conditions that they cross link terminal epoxy groups of the epoxy resins.

The following examples are illustrative of the details of at least one method of practicing this invention.

*Example 1*

5 parts THPO were mixed with 6.4 parts of a glycidyl polyether (Epon 562) and heated until the mixture appeared homogeneous. On cooling, the product was a pale amber semi-solid, soluble in water and ethanol and insoluble in acetone and toluene.

*Example 2*

To 10 parts of THPC were added 10 parts of a glycidyl polyether (Epon 562) and 2.5 parts triethanolamine. The mixture was stirred for a few minutes until an exothermic reaction began. The mixture was allowed to set until the exothermic reaction was completed and the product had cooled. The product was a water white, water soluble very viscous liquid.

*Example 3*

To 10 parts of THPC were added 5 parts of a glycidyl polyether (Epon 562) and 2.5 parts of triethanolamine. The mixture was stirred until an exothermic reaction began. It was allowed to set until the exothermic reaction was complete. The product was a very viscous, water soluble liquid.

Example 4

17 parts of the product of Example 2 were mixed with 5 parts of trimethylolmelamine in 10 parts of water and heated. After a few minutes the mixture boiled and became a clear, pale amber, flexible polymer which remained flexible under room conditions for months. This polymer was insoluble in water. When the polymer was exposed to an open flame, it charred and swelled to occupy two to three times its original volume. As soon as the open flame was removed from the polymer, burning ceased.

Example 5

10 parts THPC were mixed with 10 parts of a glycidyl polyether of a dihydric phenol (Epon 1007) and heated until a solid resin was formed. The resin was insoluble in water, contained phosphorus and would not support combustion.

Example 6

10 parts of THPC, 10 parts of butyl carbitol and 10 parts of a glycidyl polyether of a dihydric phenol (Epon 1007) were mixed and heated until the mixture appeared homogeneous. The product was a very viscous, light amber liquid. When this product was dissolved in more butyl carbitol and water added, a milk white dispersion was formed.

Example 7

To a mixture of 10 parts of THPC and 10 parts of a glycidyl polyether (Epon 562) was added enough of a solution of $Na_2CO_3$, saturated at 30° C., to adjust the pH of the mixture to about 6.5. The mixture was then stirred and an exothermic reaction began. It was then allowed to set until the product was cooled. This product was a clear water white viscous liquid, soluble in water. It would not support combustion. The water soluble product could be converted to an insoluble resin by heating it with an amine.

Example 8

5 parts of a product produced as described in Example 7 were mixed with 2.5 parts of ethanol and 1.5 parts of a saturated solution of m-phenylenediamine in ethanol. This mixture was mixed with asbestos fiber, as a filler, and spread to form a layer about 3 mm. thick. After curing in the oven at 100° C., the layer became a fiber-filled strip of plastic which would not support combustion.

Example 9

To 3.1 parts of a product produced as described in Example 7 were added 12.4 parts water and 0.6 part of 50% ethylenediamine. After thorough mixing, this material was used to coat a wood strip having a thickness of about 2 mm. and a width of about 10 mm. After curing at room temperature this strip burned slowly for a few seconds after ignition with a match and then extinguished itself with no afterglow. A similar strip coated with the unmodified epoxy resin burned briskly, and after being extinguished, glowed for several seconds.

We claim:
1. A modified glycidyl polyether resin derived from a glycidyl polyether resin having terminal vic-epoxy groups prior to modification, in which at least one of the terminal vic-epoxy groups of the resin has been converted by cleavage of the epoxy ring so that one of the vic-carbon atoms that was attached to the epoxy oxygen atom is attached to an —OH group and the other vic-carbon atom that was attached to the epoxy oxygen atom is attached to an ether group selected from the class consisting of

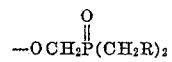

and [—$OCH_2P(CH_2R_3)$]$^+$A$^-$ wherein A represents a monovalent anion, R represents a radical selected from the group consisting of —OH and a radical produced by reacting the —OH of a ≡$PCH_2OH$ group with a compound from the group consisting of a phenol and a trivalent organic nitrogen compound selected from the group consisting of primary amines, secondary amines, and amides having hydrogen attached to nitrogen, and water-soluble methylol derivatives of said nitrogen compounds.

2. The process of producing a modified glycidyl polyether resin which comprises reacting a glycidyl polyether resin having terminal epoxy groups with a phosphorus compound having a formula selected from the group consisting of

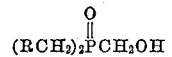

and [$(RCH_2)_3PCH_2OH$]$^+$A$^-$ wherein A represents a monovalent anion and R represents a radical selected from the group consisting of —OH and a radical produced by reacting the —OH of a ≡$PCH_2OH$ group with a compound from the group consisting of a phenol and a trivalent nitrogen compound selected from the group consisting of primary amines, secondary amines, and amides having hydrogen attached to nitrogen, and water-soluble methylol derivatives of said nitrogen compounds.

3. A modified glycidyl polyether resin produced by reacting a glycidyl polyether resin having terminal epoxy groups with tetrakis(hydroxymethyl) phosphonium chloride.

References Cited in the file of this patent

UNITED STATES PATENTS

| | | |
|---|---|---|
| 2,615,007 | Greenlee | Oct. 21, 1952 |
| 2,668,096 | Reeves et al. | Feb. 2, 1954 |
| 2,732,367 | Shokal | Jan. 24, 1956 |